Aug. 29, 1933.  H. C. JOHANSEN  1,924,436
SAFETY CLAMP
Filed Sept. 18, 1931  2 Sheets-Sheet 1

Inventor:
Harry C. Johansen.
by Luis A. Maxson.
Atty.

Aug. 29, 1933.  H. C. JOHANSEN  1,924,436
SAFETY CLAMP
Filed Sept. 18, 1931   2 Sheets-Sheet 2
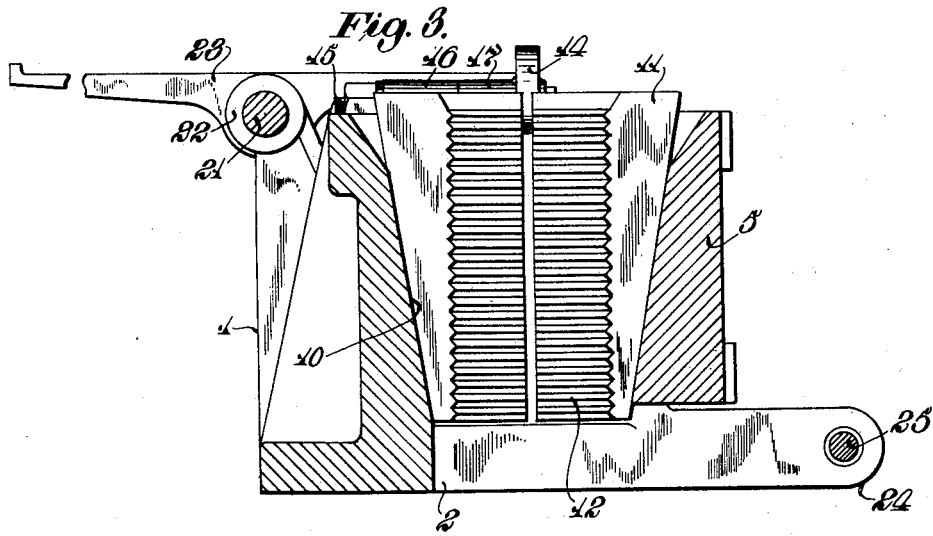
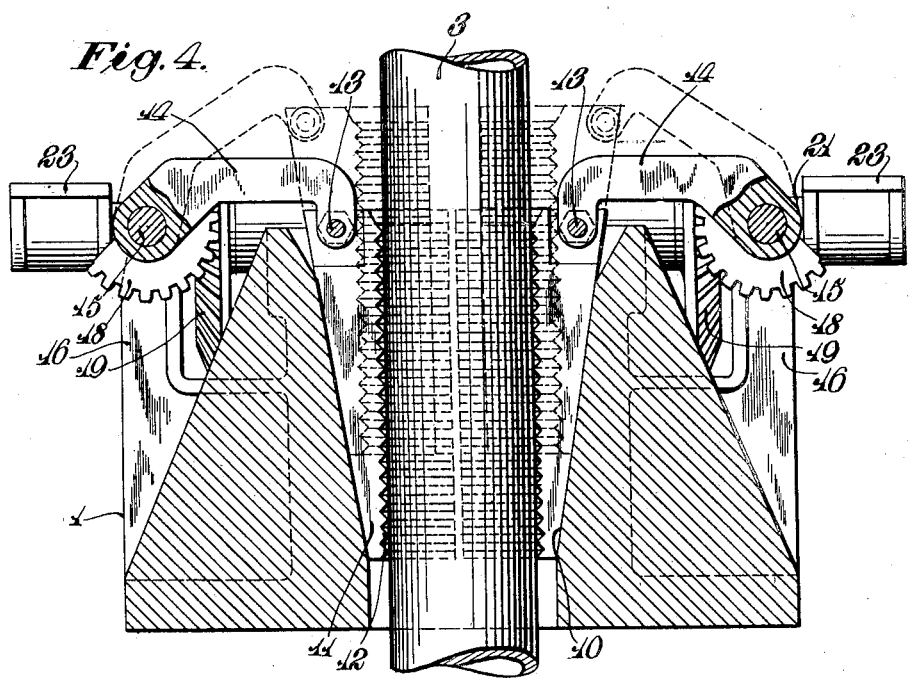
Inventor:
Harry C. Johansen.
by
Attᵞ.

Patented Aug. 29, 1933

1,924,436

UNITED STATES PATENT OFFICE 1,924,436

SAFETY CLAMP

Harry C. Johansen, Michigan City, Ind., assignor to Sullivan Machinery Company, a corporation of Massachusetts Application September 18, 1931
Serial No. 563,597

16 Claims. (Cl. 24—263.5)

This invention relates to safety clamps, and more particularly to new and useful improvements in safety clamps especially adapted to use with drill pipes of a drilling apparatus.

An object of this invention is to provide an improved safety clamp. Another object is to provide an improved safety clamp especially adapted to use with a drilling apparatus for holding the drill pipe at certain times during the drilling operation. A further object is to provide an improved safety clamp having improved means for attaching the clamp to the drill pipe and for operating the pipe gripping devices. These and other objects will, however, hereinafter more fully appear.

In the accompanying drawings there is shown for purposes of illustration one form which the invention may assume in practice.

In these drawings,—

Fig. 3 is a transverse vertical sectional view taken substantially on line 3—3 of Fig. 1.

Fig. 4 is a transverse vertical sectional view taken substantially on line 4—4 of Fig. 2.

Figure 1:
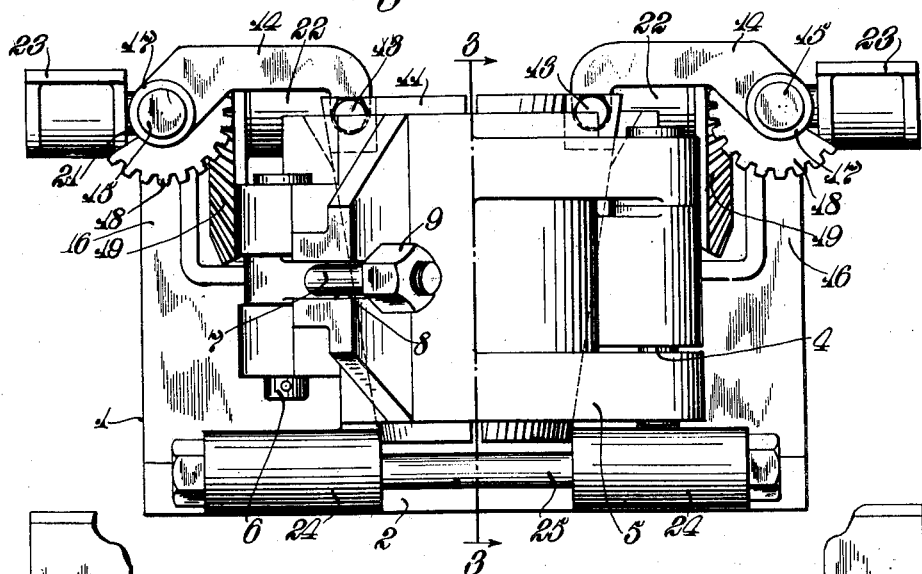
Fig. 1 is a side elevational view of the illustrative embodiment of the improved safety clamp.

In this illustrative embodiment of the invention, the improved safety clamp is shown as comprising a casing or body 1 of generally U-shape having a lateral opening 2 whereby the clamp may be slid directly onto a drill pipe, the latter being indicated at 3. Pivotally mounted at 4 at one side of this lateral opening is a closure member or gate 5 which, when in the full line position shown in Fig. 2, closes the open side of the casing. Pivotally mounted at 6 adjacent the opposite side of the lateral opening 2 is an eye-bolt 7 which, when swung inwardly into engagement with a slot 8 formed on the gate, and tightened by a nut 9, maintains the gate in its closed position. This holding bolt may be quickly released simply by loosening the nut 9 and swung laterally to the dotted line position indicated in Fig. 2, thereby to permit swinging of the gate 5 outwardly into its open position.

Figure 2:
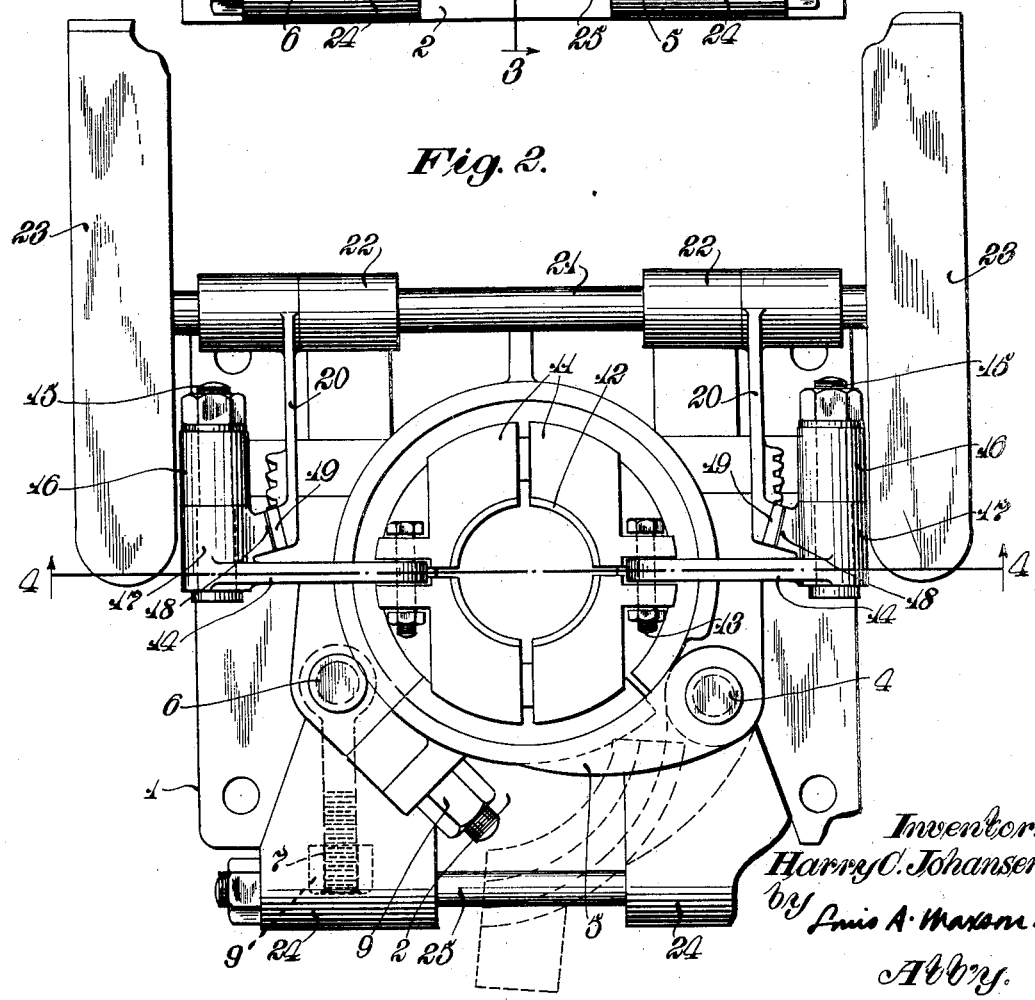
Fig. 2 is a top plan view of the clamp shown in Fig. 1.

In the present construction, the clamp body 1 is provided with a central chamber 10 having inclined side walls converging inwardly toward the bottom of the body, and mounted in this chamber are wedge-shaped pipe gripping jaws or slips 11 these jaws are herein four in number and have inclined outer surfaces engaging the inclined surfaces of the chamber and each of these jaws is provided with teeth 12 adapted to engage and grip the drill pipe. These jaws are arranged in pairs and are loosely held together by bolts 13, as shown in Figs. 2 and 4; and the means for moving these jaws into their operative gripping and released positions comprises levers 14, 14 pivotally connected at their inner ends to the bolts 13, 13, respectively, and mounted for swinging movement on pivot pins 15, 15 suitably carried by brackets 16 herein formed integral with the clamp body. The hubs 17 of these levers have formed thereon gear segments 18, 18, the teeth of which mesh with segments 19, 19. These gear segments 19 are formed on levers 20, 20 suitably fixed to a transverse treadle shaft 21 suitably journaled within bearing brackets 22, 22 herein formed integral with the clamp body. Suitably fixed to the opposite ends of this treadle shaft at the opposite sides of the clamp body are foot treadles 23, 23 each having oppositely extending operating portions. From the foregoing, it will be evident that when the operator places his foot on one or the other of the treadles 23 the treadle shaft 21 is rotated and rotation of this shaft is transmitted through the gear segments 18, 19 and the jaw levers 14, 14 to move the clamp jaws 11 into their pipe gripping or released positions as desired. As shown in Figs. 2 and 3, the ends 24, 24 of the U portions of the clamp body are connected together and braced by a transverse bracing bolt 25.

In the use of the improved safety clamp, when it is desired to place the safety clamp in position around the drill pipe 2, the bracing bolt 25 is removed and the gate 5 is swung outwardly into its open position. The clamp body is then slid in position on the drill pipe 3 and is suitably bolted or otherwise secured to the derrick floor or other suitable support. The gate 5 is then swung inwardly into its closed position and so held by the holding bolt 7. The bracing bolt is then replaced. When the clamp jaws 11 are in their raised or inoperative position, as indicated in dotted lines in Fig. 4, and it is desired to move the same into their pipe gripping position, the operator presses downwardly on one operating portion of one of the foot treadles 23, thereby swinging the jaw levers 14, 14 downwardly to the full-line position in Fig. 4; the jaws 11 then gripping the drill pipe with a wedging action due to the inclined surfaces on the jaws and the clamp body, and as a result the drill pipe is held against dropping into the drill hole. When it is desired to hoist the drill pipe upwardly, the clamp jaws 11 may be quickly released by simply pressing downwardly upon the other operating portion of one of the foot treadles. Although the chamber 10 in the clamp body is circular in shape, it will be evident that if desired the clamp body may be provided with a rectangular chamber, and that the clamp jaws may be correspondingly formed rectangular in shape instead of in the arcuate shape shown.

As a result of this invention it will be noted that an improved safety clamp is provided having improved operating means for the clamp jaws whereby the latter may be quickly moved into their gripping or released positions. It will further be noted that by the provision of the U-shaped clamp body and the pivoted gate member, it is possible to quickly attach the clamp to the drill pipe. It will still further be evident that the improved safety clamp is of an extremely simple and rugged structure particularly adapted to meet the severe demands of service encountered in drilling work. These and other uses and advantages of the improved safety clamp will be clearly apparent to those skilled in the art.

While in this application there is shown one form which the invention may assume in practice, it will be understood that this form is shown for purposes of illustration only, and that the invention may be modified and embodied in various other forms without departing from its spirit or the scope of the appended claims.

What I claim is new and desire to secure by Letters Patent is:

1. In a safety clamp, a clamp body, clamp jaws mounted in said body, and means for moving said clamp jaws into their gripping or released positions including pivoted levers connected to said jaws, an operating shaft journaled on said body, levers fixed to said shaft adjacent the opposite ends thereof at opposite sides of said body, gear segments on the hubs of said first mentioned levers intermeshing with gear segments on the extremities of said second mentioned levers, and means for rotating said shaft.

2. In a safety clamp, a clamp body, clamp jaws mounted in said body, bolts connecting said jaws together in pairs, and means for moving said jaws into their gripping or released position including pivoted levers pivotally connected to said bolts respectively, an operating shaft journaled on said body, connections between said operating shaft and said jaw levers, and means for rotating said shaft.

3. In a safety clamp, a clamp body, clamp jaws mounted in said body, and means for moving said jaws into their gripping and released positions including actuating elements connected to said jaws, a shaft journaled on said body, levers fixed to said shaft adjacent the opposite ends thereof at opposite sides of said body, gear segments on said actuating elements intermeshing with gear segments on the extremities of said levers for connecting the opposite ends of said shaft to said actuating elements respectively, and means for rotating said shaft.

4. In a safety clamp, a clamp body of generally U-shape having an open side, a pivoted gate for closing the open side of said body, clamp jaws mounted in said body, and means for moving said jaws into their operative gripping and released positions, including an operating shaft journaled on said body and connections between said jaws respectively and the opposite ends of said shaft.

5. In a safety clamp, a clamp body of generally U-shape having an open side, a pivoted gate for closing the open side of said body, clamp jaws mounted in said body, said gate being operative to retain said jaws in position within said body, and means for moving said jaws into their operative gripping and released positions, said jaw moving means including an operating shaft journaled on said body and means including intermeshing gear elements connecting said shaft to said clamping jaws.

6. In a safety clamp, a clamp body of generally U-shape having an open side, a pivoted gate for closing the open side of said body, clamp jaws mounted in said body, and means for moving said jaws into their operative gripping and released positions including an operating shaft journaled on said body and connections between said operating shaft and said jaws, said connections including intermeshing gear elements arranged at the opposite sides of said body and connected to said jaws respectively.

7. In a safety clamp, a clamp body of generally U-shape having an open side, a pivoted gate for closing the open side of said body, clamp jaws mounted in said body, and means for moving said jaws into their operative gripping and released positions including a treadle shaft journaled on said body, pivoted levers connected to said clamp jaws, and connections between said treadle shaft and said levers.

8. In a safety clamp, a clamp body of generally U-shape having an open side, a pivoted gate for closing the open side of said body, clamp jaws mounted in said body, and means for moving said jaws into their operative gripping and released positions including a treadle shaft journaled on said body, pivoted levers connected to said jaws, and intermeshing gear elements connecting said treadle shaft to said levers.

9. In a safety clamp, a clamp body, clamp jaws mounted in said body, and means for moving said jaws into their operative gripping and released positions including pivoted levers pivotally connected to said jaws, a treadle shaft journaled on said body, and intermeshing gear elements connecting said treadle shaft to said jaw levers.

10. In a safety clamp, a clamp body, clamp jaws mounted in said body, elements connecting said jaws together in pairs, and means for moving said jaws into their released position including pivoted levers pivotally connected to said connecting elements respectively, an operating shaft journaled on said body, connections between said operating shaft and said jaw levers, and means for rotating said shaft.

11. In a safety clamp, a clamp body of generally U-shape having an open side, a pivoted gate for closing the open side of said body, clamp jaws mounted in said body, and means for moving said jaws into their operative gripping and released positions including an operating shaft journaled on said body, pivoted levers connected to said clamp jaws, and connections between said operating shaft and said levers.

12. In a safety clamp, a clamp body of generally U-shape having an open side, a pivoted gate for closing the open side of said body, clamp jaws mounted in said body, and means for moving said jaws into their operative gripping and released positions including an operating shaft journaled on said body, pivoted levers connected to said jaws, and intermeshing gear elements connecting said operating shaft to said levers.

13. In a safety clamp, a clamp body, clamp jaws mounted in said body and means for releasing all of said jaws including levers each connected to a pair of said jaws, parallel shafts journaled on the opposite sides of said body and connected to said levers, respectively, and means for rotating said shafts to swing said levers including a transverse operating shaft journaled on said body at right angles to the axes of said parallel shafts and operatively connected to the latter and an operating element attached to said transverse shaft.

14. In a safety clamp, a clamp body, clamp jaws mounted in said body, and means for releasing all of said jaws including levers each connected to a pair of said jaws, parallel shafts journaled on the opposite sides of said body and connected to said levers respectively, and means for rotating said shafts to swing said levers including a transverse operating shaft journaled on said body at right angles to the axes of said parallel shafts, connections between the opposite ends of said transverse shaft and said parallel shafts respectively and an operating element attached to said transverse shaft.

15. In a safety clamp, a clamp body, clamp jaws mounted in said body, and means for releasing said jaws including levers connected to said jaws, parallel shafts journaled on the opposite sides of said body and connected to said levers respectively, and means for rotating said shafts to swing said levers including a transverse operating shaft journaled on said body at right angles to the axes of said parallel shafts and connections between the opposite ends of said transverse shaft and said parallel shafts respectively including gear elements fixed to said transverse shaft adjacent the opposite ends thereof, and gear elements fixed to said parallel shafts and meshing with said gear elements respectively.

16. In a safety clamp, a clamp body having an open side, a pivoted gate for closing the open side of said body, clamp jaws mounted in said body, and means for moving said jaws into their operative gripping and released positions including an operating shaft journaled on said body at the side thereof opposite from said gate, levers pivotally connected to said jaws and swingable in planes parallel with said shaft, and means for connecting said shaft to said levers including actuating elements secured to said shaft adjacent the opposite ends thereof and movable in planes at right angles to said planes and operatively connected to said levers.

HARRY C. JOHANSEN.